United States Patent
Leibenhaut et al.

(10) Patent No.: US 9,167,062 B1
(45) Date of Patent: Oct. 20, 2015

(54) HOLDER FOR HAND-HELD ELECTRONIC COMMUNICATION DEVICE

(71) Applicants: Leonard M Leibenhaut, Hartford, CT (US); Paul Santarsiero, Avon, CT (US)

(72) Inventors: Leonard M Leibenhaut, Hartford, CT (US); Paul Santarsiero, Avon, CT (US)

(73) Assignee: Smart And How LLC, Middletown, CT (US)

( * ) Notice: Subject to any disclaimer, the term of this patent is extended or adjusted under 35 U.S.C. 154(b) by 0 days.

(21) Appl. No.: 14/499,586

(22) Filed: Sep. 29, 2014

Related U.S. Application Data

(63) Continuation-in-part of application No. 14/207,976, filed on Mar. 13, 2014, now Pat. No. 8,861,714.

(51) Int. Cl.
  H04M 1/00 (2006.01)
  H04M 1/02 (2006.01)
  H04M 1/04 (2006.01)

(52) U.S. Cl.
  CPC .............. *H04M 1/0279* (2013.01); *H04M 1/04* (2013.01)

(58) Field of Classification Search
  CPC ........ H04M 1/04; H04M 1/05; H04M 1/0279
  USPC .............. 379/449, 446, 455, 454; 455/575.1, 455/575.6, 90.3; D14/138
  See application file for complete search history.

(56) References Cited

U.S. PATENT DOCUMENTS

| | | | |
|---|---|---|---|
| 4,154,990 A * | 5/1979 | Gumb | ............................ 379/436 |
| 4,878,237 A | 10/1989 | Cianflone | |
| 5,457,745 A | 10/1995 | Wang | |
| 6,246,764 B1 * | 6/2001 | Owen et al. | .................... 379/449 |
| 6,535,606 B2 * | 3/2003 | Cox | ............................... 379/449 |
| D548,457 S | 8/2007 | Reinerio | |
| 8,412,289 B1 | 4/2013 | Oh | |
| 8,428,665 B1 | 4/2013 | Crome et al. | |
| 8,596,412 B1 | 12/2013 | Jorgensen | |
| 8,616,327 B1 | 12/2013 | Palacios | |
| 2002/0009195 A1 | 1/2002 | Schon | |
| 2007/0045495 A1 | 3/2007 | Asano et al. | |
| 2007/0223745 A1 | 9/2007 | Eaton et al. | |
| 2007/0293277 A1 | 12/2007 | Bury | |
| 2008/0268793 A1 | 10/2008 | Nelson et al. | |
| 2009/0184145 A1 | 7/2009 | Yeh | |
| 2010/0072334 A1 | 3/2010 | Le Gette et al. | |
| 2010/0224744 A1 * | 9/2010 | Curatolo et al. | ............ 248/176.3 |
| 2011/0313334 A1 * | 12/2011 | Almeida et al. | ............... 601/134 |
| 2012/0024619 A1 | 2/2012 | Lin | |
| 2012/0027237 A1 | 2/2012 | Lin | |
| 2012/0037783 A1 | 2/2012 | Alexander et al. | |
| 2012/0312936 A1 | 12/2012 | Huang | |
| 2013/0048413 A1 | 2/2013 | Patzer | |
| 2014/0003021 A1 | 1/2014 | Bury | |

FOREIGN PATENT DOCUMENTS

| | | |
|---|---|---|
| EP | 0775609 A1 | 5/1997 |
| KR | 101278259 B1 | 6/2013 |

* cited by examiner

*Primary Examiner* — Tuan D Nguyen
(74) *Attorney, Agent, or Firm* — Wasserbauer Law LLC; Ira S. Dorman

(57) ABSTRACT

The holder for a hand-held electronic communication device comprises a base that is constructed for hand-held use, shoulder support, and surface support in a multiplicity of portrait inclination angles and landscape orientations. The holder incorporates two clamping mechanisms, one being operative for fixing its gripping part in selected positions of extension and the other desirably acting dynamically, such as by pivotal movement, for cooperatively clamping the mounted communication device in place.

14 Claims, 12 Drawing Sheets

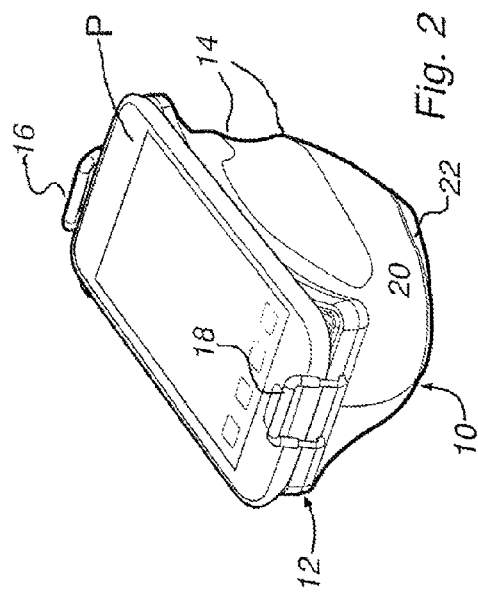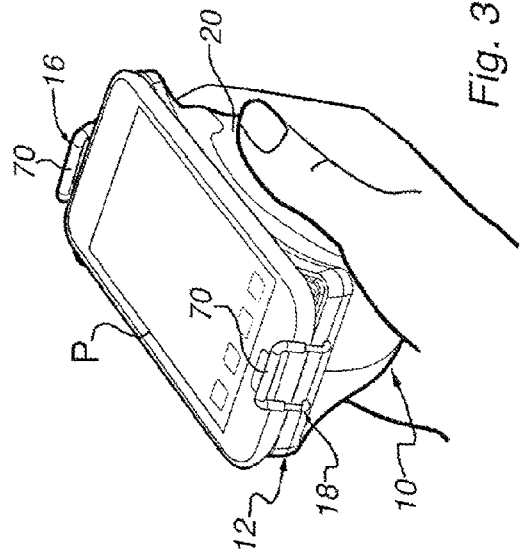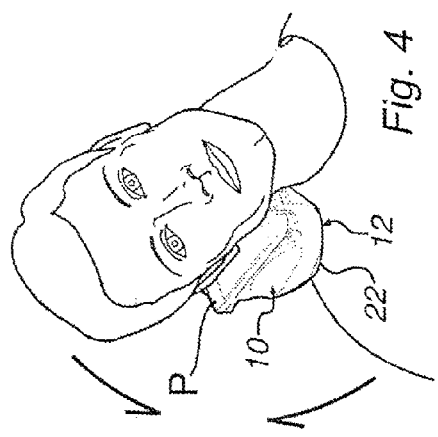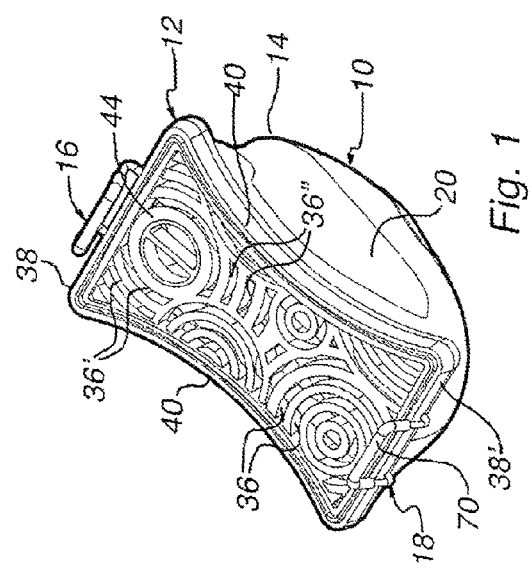

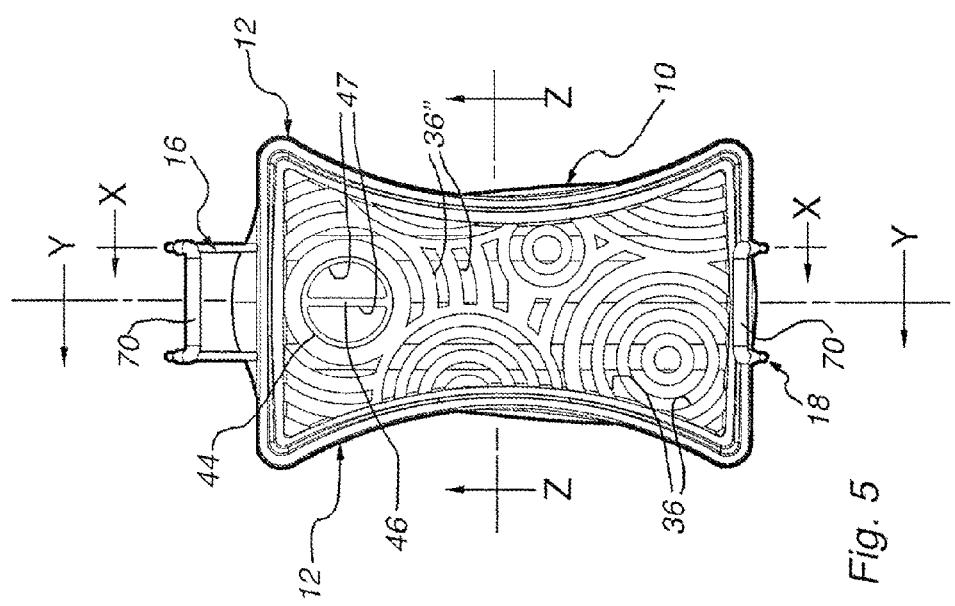

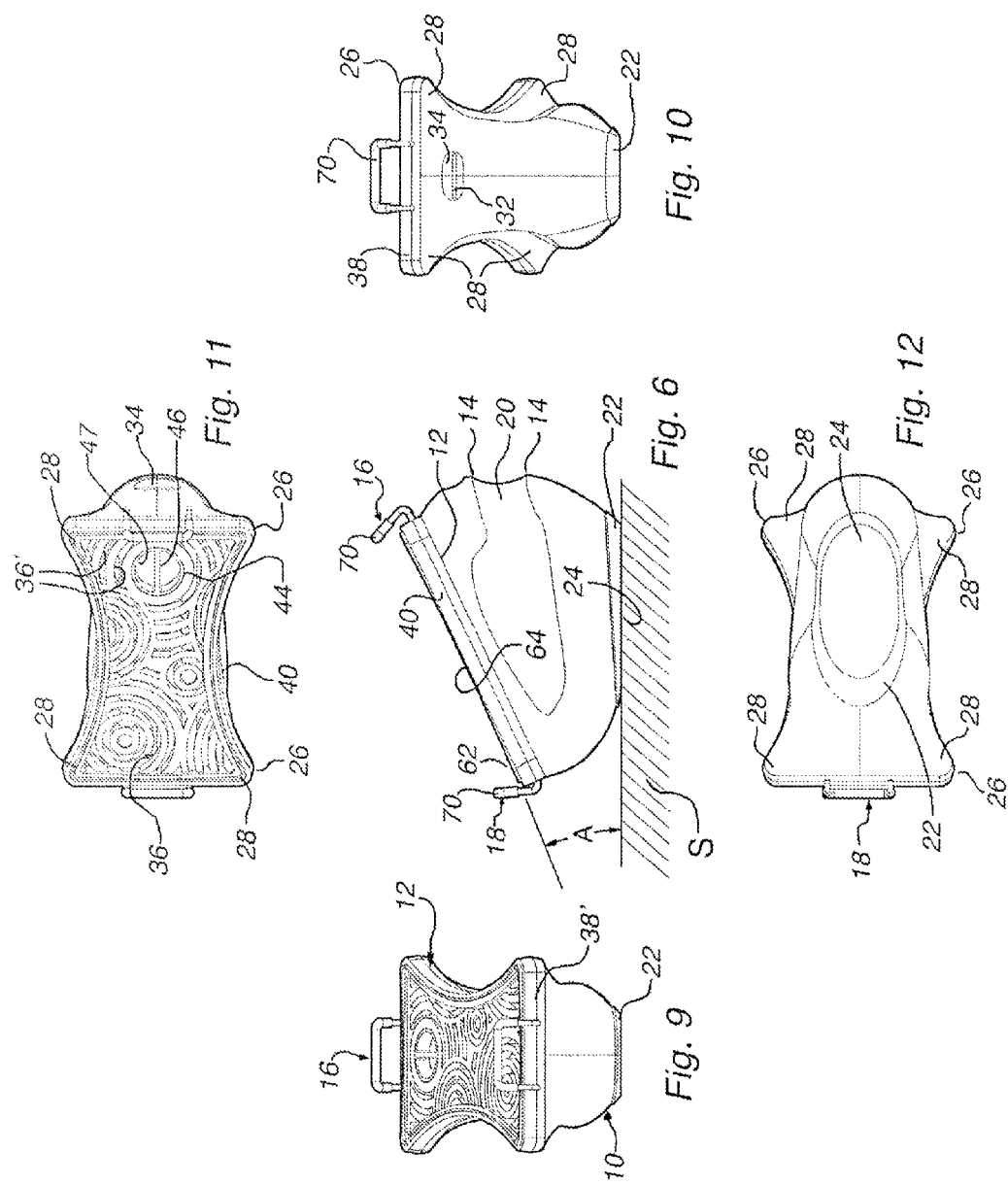

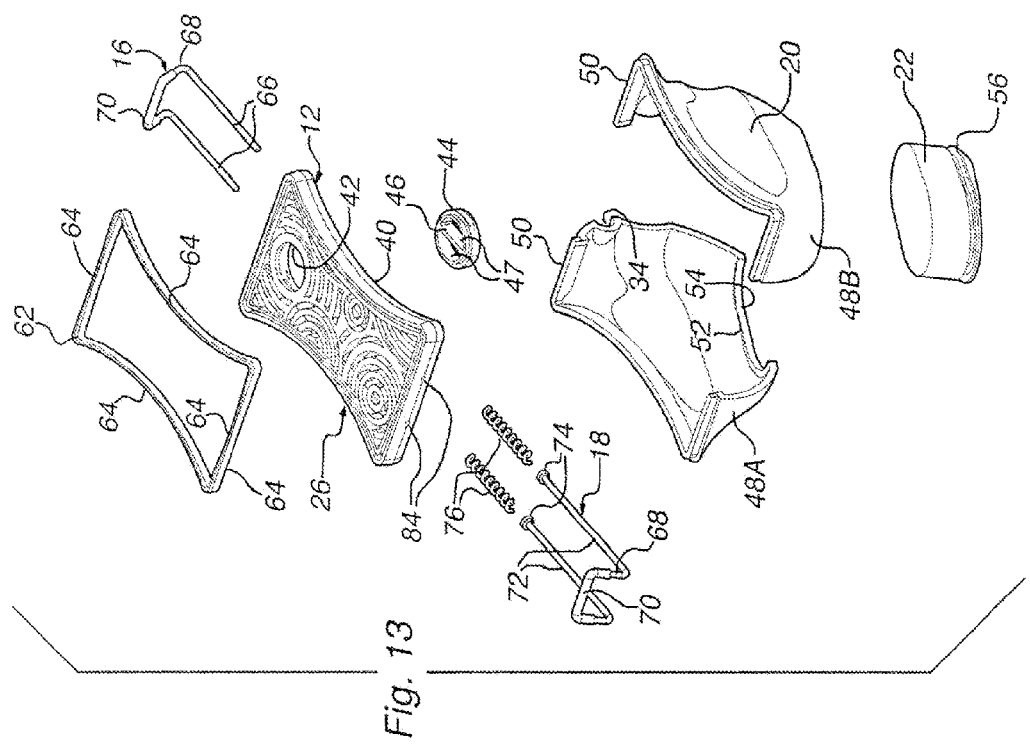

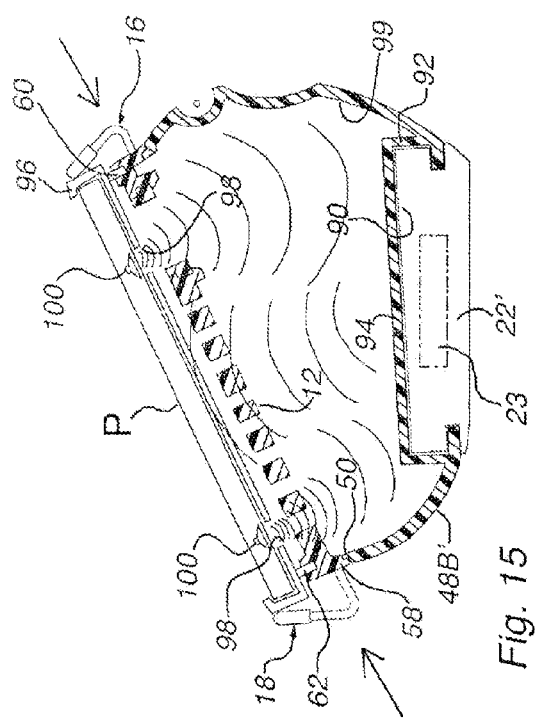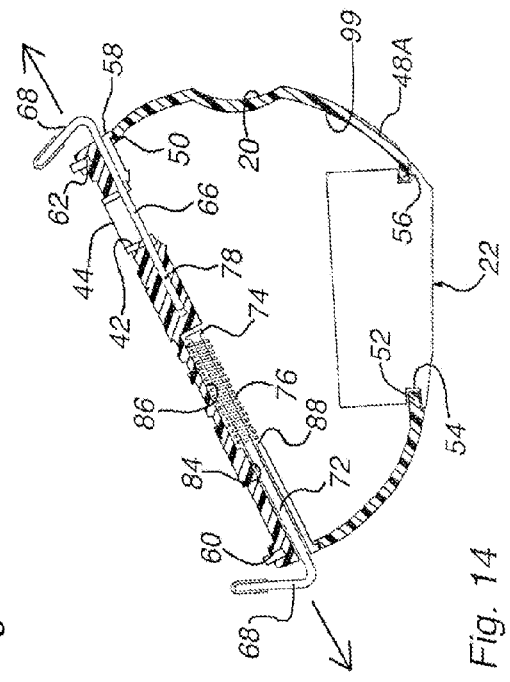

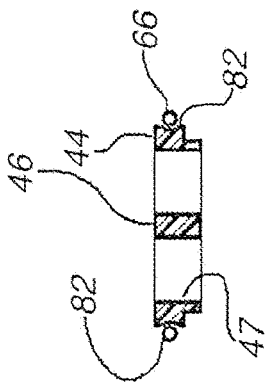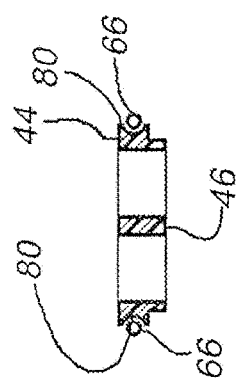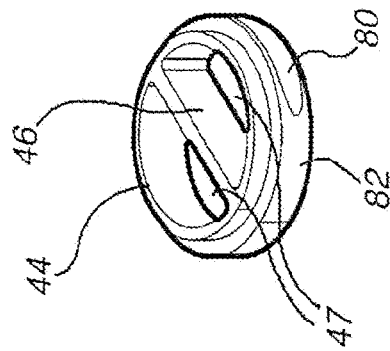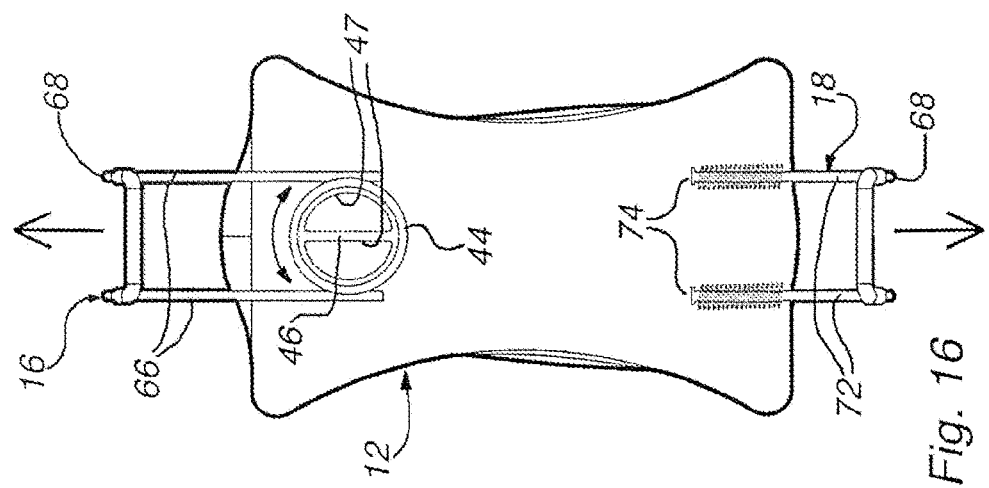

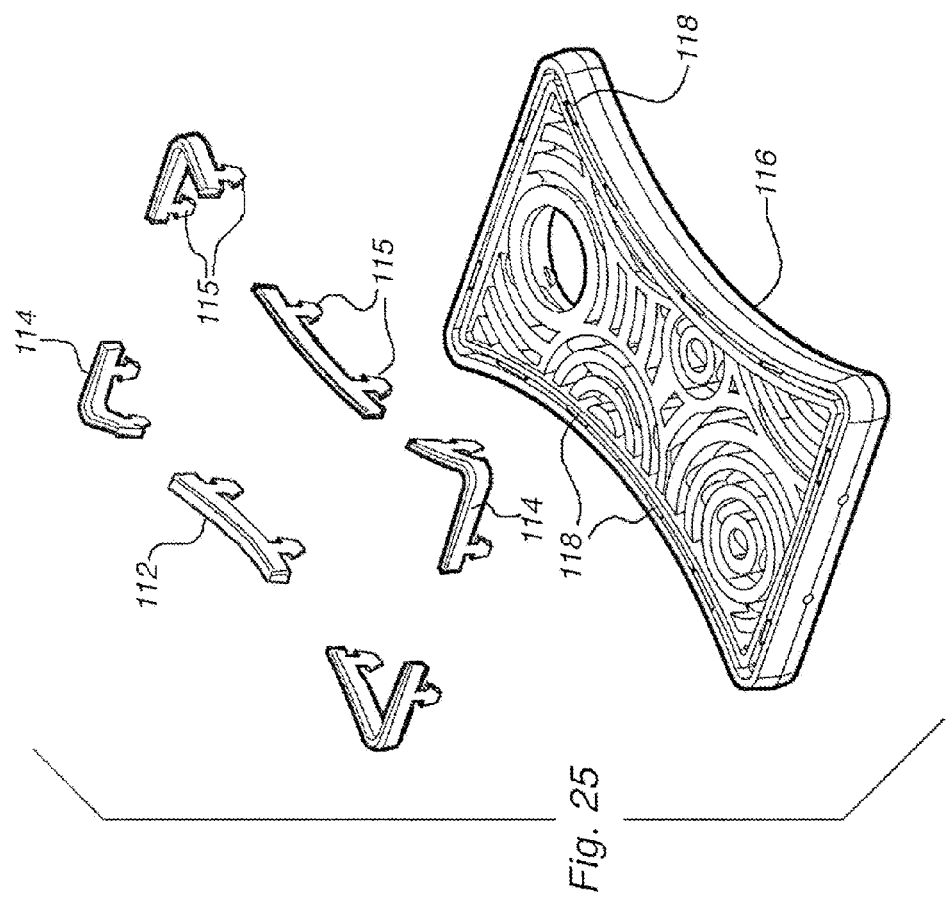

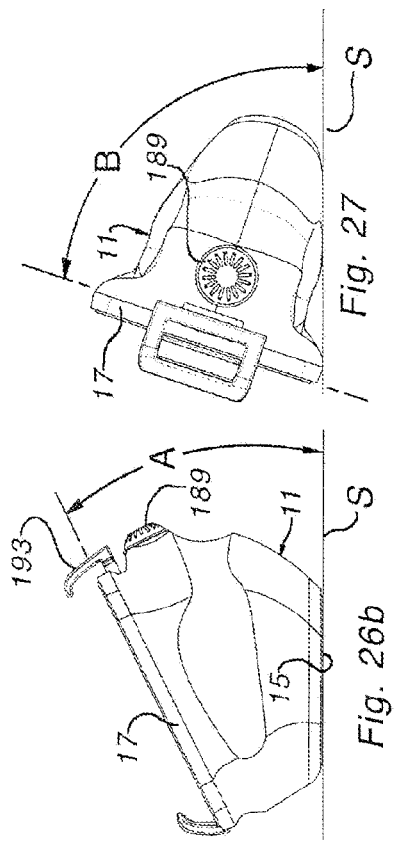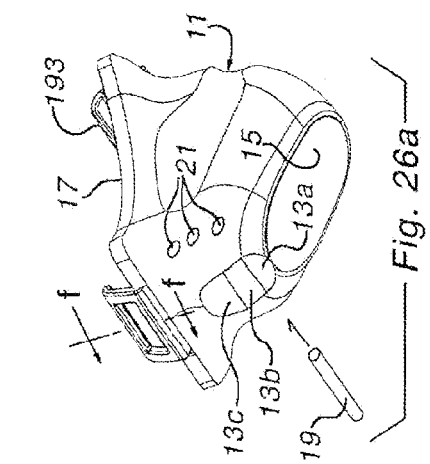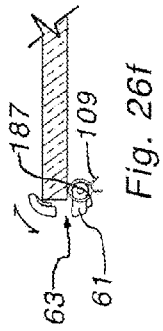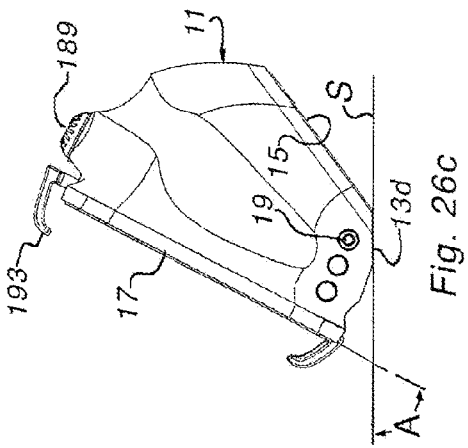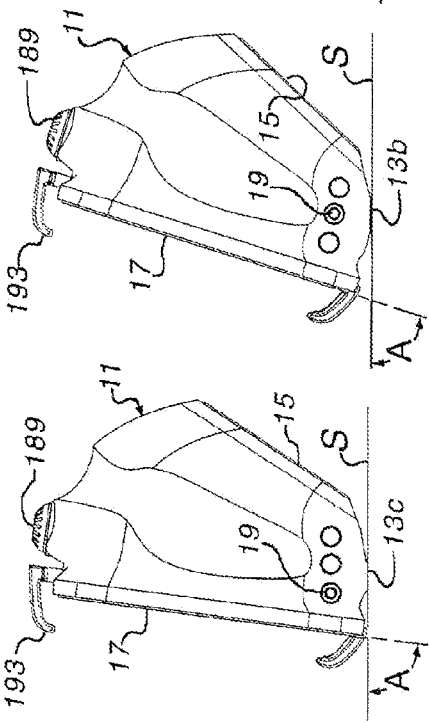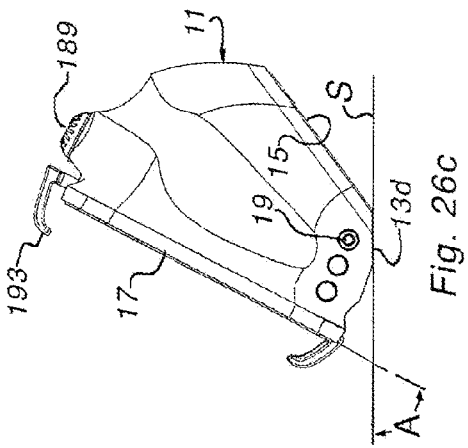

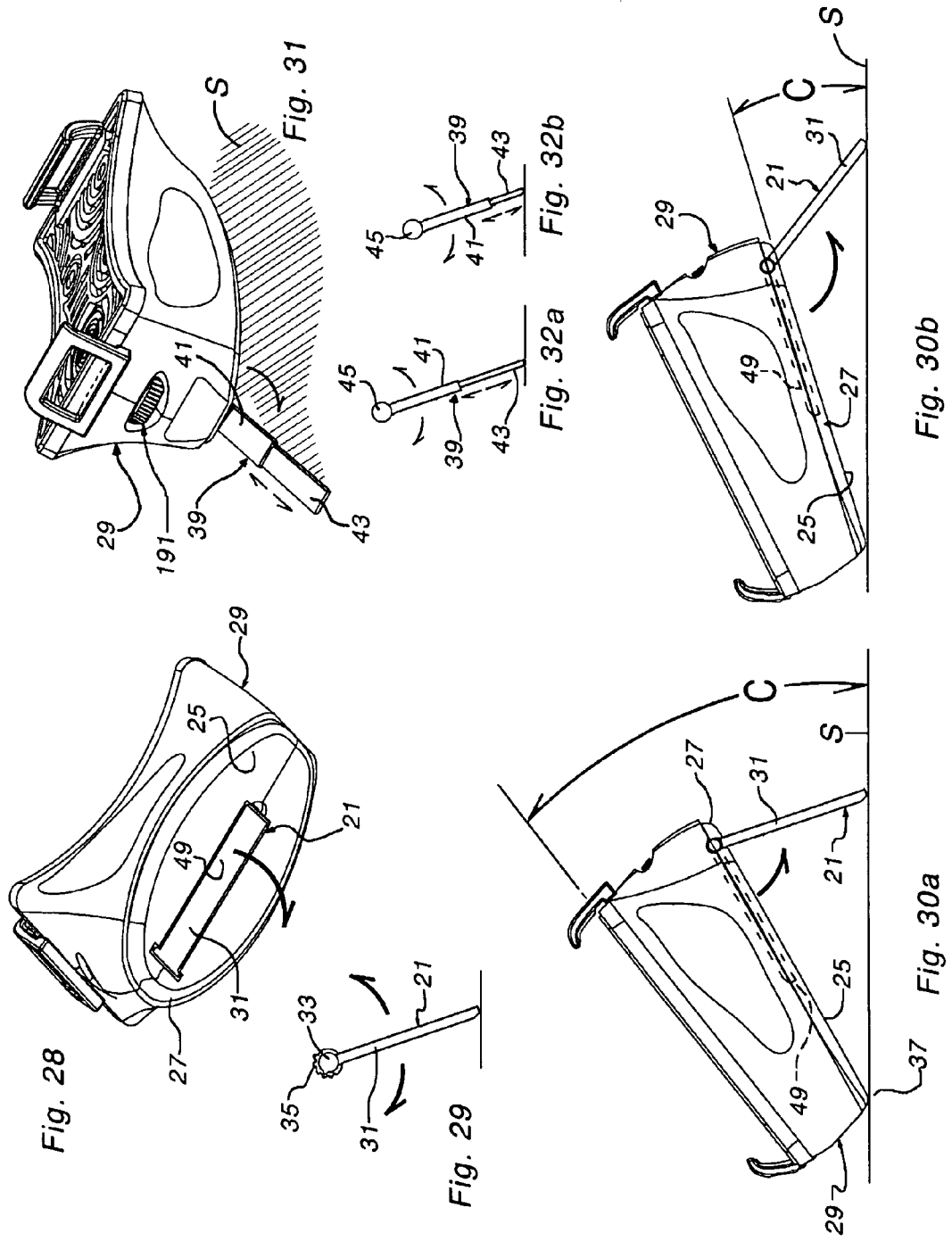

HOLDER FOR HAND-HELD ELECTRONIC COMMUNICATION DEVICE

CROSS-REFERENCE TO RELATED APPLICATION

This application is a continuation-in-part of U.S. patent application Ser. No. 14/207,976, filed Mar. 13, 2014 and issued as U.S. Pat. No. 8,861,714, the entire disclosure of which is incorporated hereinto by reference thereto.

BACKGROUND OF THE INVENTION

Smartphones and similar hand-held electronic communication devices are now globally ubiquitous and provide numerous, well-recognized commercial and social benefits. Such devices are characterized by being of flat, thin form (typically measuring, in inches, about 4⅞ to 5½ by 2¼ to 2¾ by 5/16, which is beneficial in some respects but does as well entail features that are less than entirely desirable from certain standpoints.

More particularly, when used manually smartphones (and as employed herein that term is intended to encompass analogous hand-held electronic communication devices) are normally held by the edges with the thumb and fingers, which is not entirely comfortable and may produce considerable fatigue during usages of extended duration; this is so even when the smartphone is contained in a protective, cushioning case, as it often is. Smartphones may of course also be used simply by laying them on a flat, underlying surface, but placement may not be stable or disposed at a desirable angle under some circumstances, and often support on a structural surface is simply not feasible.

Devices for holding smartphones and the like have been provided in the past but, as far as it is known, any prior holders that have enabled hands-free support and utilization of the telephonic (i.e., speaking and listening) aspects of the communication device have required speakerphone, Bluetooth, and/or microphone-incorporating headset supplemental connectivity. Moreover, such hands-free utilization alternatives are not always optimal from one or more standpoints: e.g., speakerphone use is compromised by background noise and lack of privacy; headset use is compromised by tangled cords and interruption of conversation while being plugged in; Bluetooth utilization has been minimally adopted for fashion and stylistic reasons, or otherwise; use, mounting, and dismounting of the device, is inconvenient; the holders themselves are not comfortably held for use of the mounted device; the holders do not enable the mounted device to be presented in desirable, multiple orientations; device size-accommodation is limited; the quality of projected sound may be poor; aesthetic attributes are lacking; etc.

Holders in the form of brackets or rests have of course previously been provided to enable shoulder support of conventional, land-based telephone handsets. Such holders are not adapted however for use in connection with smartphones and other electronic communication devices.

Representative of prior art of a possible interest to the present invention are the following:

| U.S. Publ. Application No. | U.S. Utility Pat. No. | U.S. Design Pat. No. | Foreign Patent Docs. |
|---|---|---|---|
| 2002/009195 | 2,486,438 | D273,677 | DE 1012006005111 A1 |
| 2002/190176 | 5,187,744 | D276,229 | DE 202004006834 U1 |
| 2004/091102 | 5,457,745 | D278,057 | DE 202005002590 U1 |
| 2005/156088 | 5,836,563 | D290,956 | DE 202011051891 U1 |
| 2006/126824 | 6,085,113 | D299,187 | EP 0775609 |
| 2006/183511 | 6,229,891 | D321,186 | FR 2917354 |
| 2007/045495 | 6,285,758 | D367,065 | GB 2438662 |
| 2007/223745 | 6,966,533 | D449,043 | KR 101186441 |
| 2008/268793 | 6,980,836 | D449,831 | KR 101278259 |
| 2008/296332 | 8,412,289 | D453,017 | KR 20050020901 |
| 2009/184145 | 8,428,665 | D548,457 | WO 9857568 |
| 2009/270143 | 8,596,412 | D596,393 | WO 11152597 |
| 2011/000945 | 8,616,327 | D623,651 | WO 12016862 |
| 2011/143583 | | D658,167 | |
| 2011/163211 | | D676,034 | |
| 2011/183728 | | D678,870 | |
| 2012/024619 | | | |
| 2012/027237 | | | |
| 2012/037783 | | | |
| 2012/235005 | | | |
| 2012/303146 | | | |
| 2012/312936 | | | |
| 2013/048413 | | | |
| 2014/003021 | | | |

Despite the activity in the art indicated by the foregoing, the deficiencies described above have not been adequately addressed or satisfied.

BRIEF SUMMARY OF THE INVENTION

Accordingly, it is a broad object of the present invention to provide a holder for a hand-held electronic communication device which is convenient and comfortable to use, and which does not require supplemental connectivity.

A more specific object of the invention is to provide such a holder which affords secure support for a smartphone, both on an underlying flat support surface, in portrait and landscape orientations, in a multiplicity of angular attitudes or inclination angles, and also in positions nested in the space between a user's shoulder and head.

Another specific object of the invention is to provide such a holder which is of ergonomic construction for comfortable and secure, ambidextrous, hand-held manual use.

A further specific object is to provide a holder that is capable of use for electronic communication devices having a range of sizes and shapes, while also affording quick and facile mounting and dismounting of the device on and from the holder.

A still further object the invention is to provide a holder having the foregoing features and advantages which also affords a high degree of aesthetic appeal.

It has now been found that the foregoing and related objects of the invention are attained by the provision of a holder for the stable support upon a user's shoulder, and upon an underlying planar surface in at least two orientations and at variable angular attitudes, as well as for manual gripping, of a hand-held electronic communication device, comprising: a generally wedge-shaped base having a front, a back, a top, a bottom, and laterally opposite sides, and being constructed to enable secure, manual gripping of the holder; generally planar face structure on the front of the base; and retaining means for disengageably mounting a thin, flat, generally rectangular hand-held electronic communication device, optionally contained within a case therefor, on the face structure of the base.

The base of the holder has a back surface constructed for stably supporting the holder both between a user's shoulder and head (i.e., against his or her face) and also in a freestanding upright state, in a first angular attitude of the face structure of the base, on an underlying planar surface of a supporting structure, with the face structure and the back surface of the base lying substantially on planes that intersect at a first angle, having a value of at least about 10 degrees, so as to dispose the face structure at the first angle relative to such an underlying planar surface and for portrait orientation of such an electronic communication device so mounted, when the base is so supported on an underlying planar surface. Supplemental means is provided on the holder for stably supporting the holder in at least one second freestanding upright state, at least one second angular attitude of the face structure, on an underlying planar surface of a supporting structure, for portrait orientation of such electronic communication device so mounted, the face structure being disposed, relative to the underlying planar surface of supporting structure, at an angle that is greater then the first angle, and is as large as about 90 degrees, in the at least one second angular attitude.

The holder is additionally constructed for stably supporting it in at least one third freestanding upright state on such an underlying planar surface, rotated 90 degrees from the portrait orientations, about an axis normal to the plane of the face structure, for landscape orientation of such an electronic communication device, so mounted.

In certain embodiments the supplemental means for supporting comprises at least a first substantially flat surface disposed on the back of the base between the back surface and the bottom of the base, the first substantially flat surface lying substantially on a plane that intersects the plane on which the face structure lies at the at least one second angle. In such embodiments the supplemental means for stably supporting may further comprise a second substantially flat surface disposed on the back of the base between the first substantially flat surface and the bottom of the base, the second substantially flat surface lying substantially on a plane that intersects the face structure at another "second" angle, the another second angle having a value substantially greater than the value of the at least one second angle. The holder may additionally include at least one weighing element selectively attached to the base for relocation of the center of gravity of the holder so as to increase positional stability with the holder resting on each of the first and second substantially flat surfaces comprising the supplemental means for supporting.

In other embodiments the supplemental means for supporting comprises a prop member on the holder that is movable from a nonfunctional position to at least one functional position in which the prop member extends backwardly, relative to the base, for contact with such an underlying planar surface so as to dispose the face structure, in cooperation with other structure of the holder, at the at least one second angle. The prop member will usually be of elongated form, and will desirably be of selectively variable length for enabling variation of the value of the at least one second angle with the prop member in the at least one functional position. Alternatively (or additionally), the means for supporting may include means for selectively varying the angle at which the prop member extends backwardly, relative to the base, in the at least one functional position for enabling variation of the value of the at least one second angle.

The retaining means of the holder will normally include a bottom gripping part that is mounted adjacent the bottom of the base for movement between a gripping position and a release position, the bottom gripping part preferably being biased toward the gripping position. Such a bottom gripping part will desirably be pivotably mounted on the holder, and it will most desirably have a surface that comprises, in the gripping position, the supplemental means for stably supporting the holder.

The first angle at which the face structure and back surface of the holder base intersect will usually have a value in the range of about 20 to 30 degrees, with the supplemental supporting means potentially extending the inclination angle to about 85 degrees (a 90 degree inclination angle would normally be achieved by supporting the holder on the front edge structure, and a 10 degree angle of inclination will be most effective to reduce or eliminate glare). The retaining means of the holder will normally act to apply clamping force, and will desirably include a bottom gripping part that is mounted adjacent the bottom of the base for movement between a gripping position and a release position, and a coarse adjustment mechanism that includes a top gripping part that is disposed adjacent the top of the base, the coarse adjustment mechanism being operable to selectively position the top gripping part so as to cooperate with the bottom gripping part for applying such clamping force and for varying the distance over which such clamping force is applied.

The holder will usually additionally include a multiplicity of supporting contact elements for stably supporting the holder in the at least one third freestanding upright state, a first plurality of at least three of the contact elements lying in a common plane, on one side of the base, that intersects the plane of the face structure at a third angle, having a value of about 45 to 85 degrees, so as to dispose the face structure at the third angle, the third angle usually relative to such an underlying planar surface, when the base is so supported by the first plurality of contact elements, for landscape orientation of a so mounted electronic communication device, so mounted.

In more specific embodiments of the holder: the base will be symmetrical about a longitudinal central axis, for ambidextrous use; the holder will include a faceplate overlying the front of the base, providing the face structure, and having a longitudinal axis that extends between the top and bottom of the base and a transverse axis that extends between the opposite sides of the base; the retaining means will be constructed for mounting a hand-held electronic communication device in position on a faceplate with a longitudinal axis and a transverse axis of the communication device aligned with the longitudinal axis and transverse axis, respectively, of the faceplate, the transverse axis of the faceplate being parallel to the underlying surface in portrait orientations of a mounted electronic communication device and the longitudinal axis of the faceplate being parallel to the underlying surface in landscape orientations; the back surface of the holder base will be constructed to have nonskid properties; and the base will have at least one area, at a level intermediate the front and the back, that is dimensioned and configured to enhance the secure, hand-held manual gripping of the holder.

BRIEF DESCRIPTION OF THE SEVERAL
VIEWS OF THE DRAWINGS

FIG. 1 is a perspective view of a holder that constitutes a precursor to holders embodying the present invention.

FIG. 2 is a perspective view of the holder of FIG. 1 with which a hand-held electronic communication device is assembled.

FIG. 3 is a perspective view of the assembly of FIG. 2, held in the hand of a user.

FIG. 4 is a perspective view of the assembly of FIG. 2, supported in the space between the shoulder and head of a user.

FIG. 5 is front view of the holder of FIG. 1, drawn to a somewhat enlarged scale.

FIG. 6 is a side elevational view of the holder of FIG. 1, resting upon a horizontal support surface in portrait orientation.

FIG. 9 is a bottom end view of the holder of FIG. 1, as situated in FIG. 6.

FIG. 10 is a top end view of the holder of FIG. 1, as situated in FIG. 6.

FIG. 11 is a front view of the holder of FIG. 1, as situated in FIG. 6.

FIG. 12 is a back view of the holder of FIG. 1.

FIG. 13 is an exploded perspective view of the holder of FIG. 1.

FIG. 14 is a longitudinal sectional view of the holder of FIG. 1, taken along line X-X of FIG. 5.

FIG. 15 is a longitudinal sectional view of a holder, taken along line Y-Y (the central plane) of FIG. 5, with which a smartphone, contained in a case, is assembled.

FIG. 16 is a diagrammatic view of the holder of FIG. 1, from which the front section of the faceplate has been removed to expose internal features, and with the cam knob orientated so as to permit free sliding movement of the clamping member relative to the faceplate.

FIG. 17 is a perspective view of the cam knob that is mounted in the faceplate of the holder, drawn to an enlarged scale.

FIGS. 18A and 18B show, in diametrical cross section taken through the cam knob, the relationships that exist between the cam knob and the clamping member for free sliding movement, as in FIG. 16, and in locking position, respectively.

FIG. 25 is an exploded perspective view, drawn to an enlarged scale, depicting a segmented form of gasket, and a faceplate to which it is attached when assembled.

Figure 7:
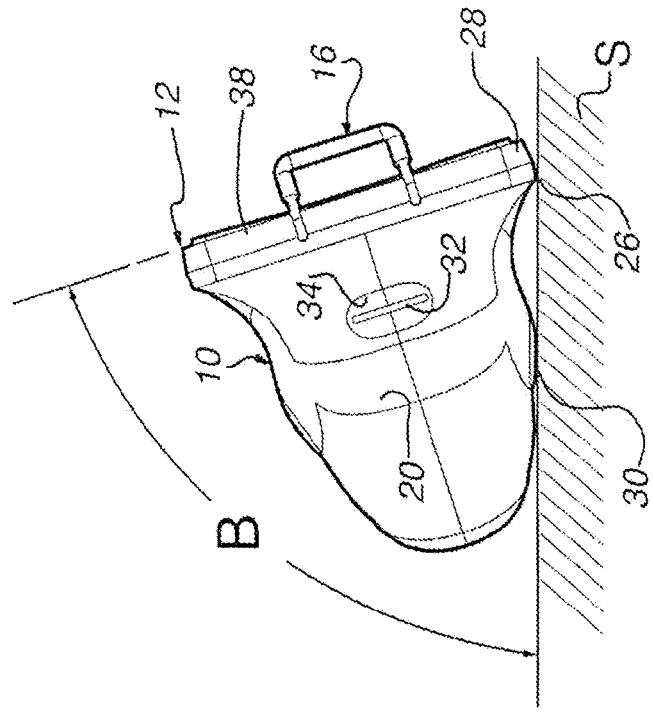
FIG. 7 is an elevational view of the holder of FIG. 1, taken from the top end of the holder and resting upon a horizontal support surface, in landscape orientation.
Figure 8:
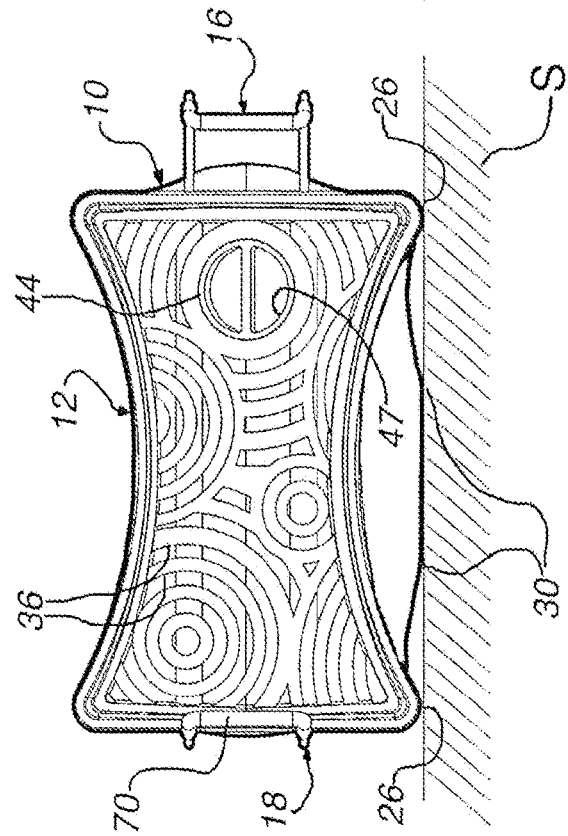
FIG. 8 is a front view of the holder in the landscape orientation of FIG. 7.

FIG. 26a is a perspective view showing a holder of the invention, with a weighting rod positioned for assembly therewith; FIGS. 26b, 26c, 26d and 26e are side elevational views of the holder of FIG. 26a, disposed in four portrait orientations with the faceplate at different angles of inclination relative to a supporting surface; and FIG. 26f is an enlarged, fragmentary section view, taken along line f-f of FIG. 26a, showing a smartphone mounted in the holder with the bottom gripping part in its gripping position and providing supplemental supporting means as well.

FIG. 27 is an elevational view of the holder of FIG. 26, taken from the top and with the holder disposed in a landscape orientation.

FIG. 28 is a perspective view of a holder embodying the invention, taken from the back and depicting a prop, or "kick stand," seated in a recess provided in the back surface in its stowed, inoperative position.

FIG. 29 is a view of the prop on the holder of FIG. 28, with arrows indicating variation of its angular attitude.

FIGS. 30a and 30b are side elevational view of the holder of FIG. 28, showing the prop extended obliquely so as to dispose the holder at each of two angular attitudes relative to a supporting surface.

FIG. 31 is a perspective view of a holder similar to that of FIGS. 28, 29, and 30 but wherein the prop comprises telescopically interengaged elements.

FIGS. 32a and 32b depict the prop utilized in the holder of FIG. 31, showing the internal element extended different distances out of the external element so as to thereby enable variation of the angular attitude of a holder incorporating the prop.

DETAILED DESCRIPTION OF THE INVENTION

Turning initially in detail to FIGS. 1 through 25 of the appended drawings, therein illustrated is a holder for a handheld electronic communication device, constituting a precursor to holders embodying the present invention and including many elements and features in common therewith and which may be incorporated thereinto, as will be apparent to those of ordinary skill in the art from the description that follows.

The holder depicted consists of a generally wedge-shaped, bulbous base, generally designated by the numeral 10, and a faceplate, generally designated by the numeral 12, attached thereto. With the exception of the pattern of holes or perforations in the faceplate 12, the holder is symmetric about a central plane extending along its longitudinal axis (i.e., from top to bottom).

As seen in FIGS. 2 through 4, the device mounts a handheld electronic communication device in the form of a smartphone, P, which is removeably held in position against the faceplate 12 by the cooperative action of a top wire-form, partially coated, clamping member and a bottom wire-form, partially coated, clamping member, generally designated respectively by the numerals 16 and 18. As depicted in FIG. 2 the holder is supported on a horizontal surface (not shown), with the smartphone P in portrait orientation; as depicted in FIG. 3 the holder is held manually (i.e., in the user's hand); and as depicted in FIG. 4 the holder is supported between the head and shoulder of a user, with the smartphone P positioned effectively to transmit sound to the user's ear while, at the same time, allowing the user's voice to be picked up by the microphone in the contained phone.

The base 10 is shaped ergonomically (as is perhaps best seen in FIGS. 1, 2, and 6), with a recess or channel 20 that extends continuously and symmetrically along the opposite sides and the across the top of the base 10, for palm-rest support and to receive the thumb and fingers of a user, and is bounded by integral, gentle ridge-like structures 14 to enhance the security of gripping. In preferred embodiments channel 20 will have a surface having a high coefficient of friction. A suitable element may be molded separately from the housing components, using a relatively soft, rubber-like material, and subsequently affixed; or it may be over-molded in an operation in which the softer grip material fuses to the harder material from which the base housing is fabricated. An attached anti-skid base insert 22 protrudes from the back of the base 10, to enhance the positional stability of the holder, both while supported upon a user's shoulder and also while lying upon the surface of an underlying structure. The insert 22 will normally be comprised of a natural or synthetic rubber or rubber-like material of low durometer value (e.g., an elastomeric thermoplastic), so as to inherently provide anti-skid, friction or drag-producing properties to its bottom surface; such a material will also increase hand-held tactile comfort. In addition, the insert may be relatively heavy so as to lower the center of gravity of the base and thereby increase the stability of the holder when it is in the upright position depicted; the effect may be augmented by incorporating weighting elements (e.g., metal pieces or a metal core, see FIG. 15) within the insert. As seen in FIG. 10, a pin 32 extends laterally in a recess 32 formed into the top of base 10, and serves for attachment of a strap, lanyard, or other means for conveniently carrying the holder when it is not in use.

FIG. 6 depicts the holder lying upon a support structure, with the bottom surface 24 of the base insert 22 in direct contact with the underlying surface S. As so positioned, a mounted communication device would be displayed in portrait orientation, with the plane of the faceplate 12 forming an angle A with the supporting surface S. Typically, in the illustrated holder, the angle A will have a value of about 20° to 35°, and preferably about 25° to 30°, the value being about 26° in the illustrated embodiment.

FIG. 7 is a view of the holder of the foregoing figures supported on one side, in landscape orientation of a mounted communication device, so as to rest on contact elements 26, provided by corners 28 of the base plate 12, and contact elements 30 on the base 10. It will be appreciated that the holder may be supported in the same way on its opposite side, in a second (i.e., 180° rotated) landscape orientation. As so displayed the common plane on which the contact elements 26, 30 lie forms an angle B with plane of the faceplate 12. The angle B, in the illustrated holder, will typically have a value of 60° to 75°; as depicted in FIG. 7, the angle has a value of about 72°.

The faceplate 12 is flat, thin, and generally rectangular, having rectilinear top and bottom margins 38, 38' but deviating from true rectangularity by reason of lateral margins 40 that are arcuately indented, and of concave contour, to impart an hourglass-like configuration to the faceplate 12. As will be appreciated, this configuration provides the rounded, acute angle corners 28 which, in turn, provide contact elements 26. The spacing from an underlying supporting surface, resulting from the concavity of the margins 40, promotes forward projection of sound waves emanating from behind a mounted device and, in instances in which the corners extend beyond the margins of a mounted device, exposed perforations in the faceplate also contribute to forward sound projection. The configuration contributes to the ergonomic character of the holder as well, and may afford an improved grip.

The faceplate 12 is formed with a pattern of holes or perforations, such as are designated, for example, 36, 36', 36" in FIG. 1. It will be appreciated that the pattern of perforations is arbitrary and may take virtually any form, which form may be designed so as to import a desirable aesthetic feature to the faceplate. Needless to say, however, perforations such as 36, 36', 36"serve important acoustic functions in the holder, facilitating the transmission of sound from speakers incorporated in the mounted device P, which are often directed outwardly from the back of the device (albeit they may be provided elsewhere, such as on the front and/or along an edge); the perforations also permit sound waves directed into the base housing, and reflected, to exit from the front.

A circular hole 42 is formed through the faceplate 12, near its top end and on the longitudinal centerline of the base 10, and a cam knob 44 is rotatably mounted in the hole 42 for a purpose to be described below. Mounting may be effected, for example, by snapping the knob 44 into the faceplate from the underside, such as by providing three equidistantly spaced interference wedges molded into the bottom edge surrounding the hole 42, or by trapping it between a secondary, underlying mounting plate and the faceplate. It will be noted that the knob 44 has a diametrically extending operating handle 46, to the opposite sides of which are formed semicircular apertures 47; apertures 47 also serve to facilitate the transmission of sound through that area of the faceplate 12.

As seen in FIG. 13, the base 10 of the holder is fabricated as two molded pieces, or sections, 48A, 48B, which are of mirror image construction and are joined at the longitudinal centerline of the base 10 to form a hollow housing. Joinder may be effected by fusion, if the material of fabrication is a thermoplastic resin, by adhesive bonding, by mechanical interengagement, and/or any other suitable means. Typically, styrene, polypropylene, polyethylene, ABS, or other hard, rigid synthetic resinous materials will be used for fabrication of the housing.

An upstanding flange 50 extends on the periphery of each housing section 48A, 48B to circumscribe an open top when the sections are joined to one another, and bottom flanges 52 cooperatively circumscribe a straight-sided oval opening 54 in the base 10. The anti-skid base insert 22 is correspondingly formed with a circumferential groove 56, in which the bottom flanges 52 seat to mount the insert 22 within the opening 54.

As best seen in FIGS. 14 and 15, the faceplate 12 is formed with a peripheral flange or lip 58, which mates with the peripheral flanges 50 of the base 10 for secure interengagement of the two components. It will be appreciated that this assembly may also be joined adhesively, thermally, mechanically, or by any other suitable means.

Figure 24:
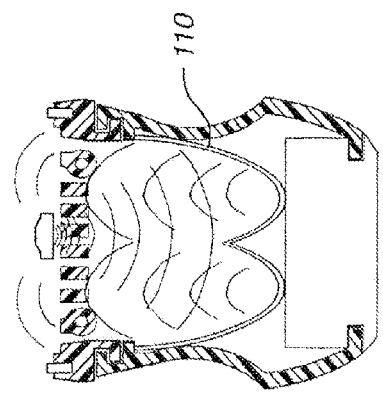
FIG. 24 is a perspective view, drawn to an enlarged scale, depicting a peripheral gasket utilized in the faceplate of certain embodiments, being of gradually varying height along its length.

A peripheral grove 60 surrounds the front of the faceplate 12, and serves to seat a resilient gasket 62. As best seen in FIGS. 6, 13, and 24, the height of the gasket 62 varies gradually along its length, providing sections with low points at 64. The low sections produce gaps at the back of a mounted smartphone, or other device P, and serve to promote and facilitate the propagation of sound outwardly from thereunder.

The top clamping member 16, referred to above, is formed with a pair of parallel legs 66 and a connecting U-shaped section 68, which is covered by a resilient protective element 70 (e.g., of latex or another rubbery material). As is best seen in FIG. 14, the faceplate 12 is formed to have a pair of parallel bores 78 (only one of which is visible in the figure) extending inwardly from the top, each receiving one of the legs 66 in slidable relationship. Although not shown, each leg may have a right-angle finger at its inner and to provide a maximum-extension stop point.

As is best seen in FIG. 17, the cam knob 44 is formed with a pair of long notches 80 (only one of which is visible in this figure), which extend sequentially on directly opposite sides of its peripheral (cylindrical) surface, with full diameter areas 82 (or at least shallower grooves) extending generally circumferentially between the notches 80. The circular aperture 42 in the faceplate 12 intersects both of the bores 78 and thus permits engagement of the knob 44 with the legs 66. As depicted in FIGS. 16 and 18A, the knob 44 may be oriented so as to permit free sliding movement of the legs 66 in the bores 78, thereby enabling facile adjustment of the position of the U-shaped section 68 in spaced relationship to the faceplate 12. As seen in FIG. 18B, the knob 44 has been rotated (e.g., through a quarter-turn, in either direction, from the orientation shown in FIG. 16) so as to present the relatively shallow grooves or full-diameter areas 82 to legs 66, thereby locking them in any selected position throughout the range of extension of the clamping member 16 from the faceplate 12. The knob may be provided with antiskid rubber inserts on leg-engaging surfaces so as to increase the locking effect, for which purpose the legs may also be knurled or textured. Detent elements may be incorporated to provide tactile feedback, and a visual scale may correlate to particular communication devices to indicate optimal force-related clamping positions.

The bottom clamping member 18 is also formed with parallel legs 72 connected by a protectively covered U-shaped section 68. The free end of each of the legs 72 how-ever carries a stop-element 74, and a coil spring 76 is disposed on each leg 72.

With reference again to FIG. 14, it is seen that a second pair of parallel bores 84 (only one bore again being visible in the figure) extend inwardly from the bottom end of the faceplate 12 and slidably receive the parallel legs 72 of the bottom clamping member 18. An elongate slot or recess 86 is formed into the back of the faceplate, at the inner end of each bore 84, and serves to receive the coil spring 76 mounted on the inner portion of each leg 72. The spring 76 bears at one end upon the stop element 74 of the respective leg 72, and at the opposite end upon the adjacent bearing surface 88 of the faceplate formed at the intersection of the slot 86 and bore 84. The springs 76 bias the bottom clamping member 18 toward the faceplate 12 and the top clamping member 16.

Thus, as seen for example in FIG. 15, a smartphone P is clamped in position, above the faceplate 12 (i.e., with the gasket 62 interposed), by the cooperative action of the clamping members 16, 18. Variation of the spacing between those members is achieved, to accommodate communication devices of a range of different lengths, by extending the top clamping member 16 an appropriate distance away from the faceplate 12, and locking it in that position by operation of the cam knob 44 (turning it in either clockwise or counterclockwise) so as to establish the relationship depicted in FIGS. 2, 3, etc. The tension applied by the springs 76 causes bottom clamping member 18 to dynamically cooperate with top clamping member to maintain the device in position, but the member 18 may readily be extended, against the force of the springs, so as to release and dismount the smartphone quickly and conveniently, when so desired; needless to say, the smartphone is readily replaced.

It will be appreciated that the peripheral gasket 62 serves not only to cushion a smartphone P mounted on the faceplate 12 but also to produce a frictional restraint against movement, and undue displacement, of the smartphone relative to the holder. As noted above, moreover, the gasket 62 is formed so as to permit sound propagation from a rear-mounted speaker 100 in both lateral and transverse directions.

FIG. 15 diagrammatically simulates the forward and rearward progression of sound waves emanating (upwardly curved waves) from speakers 100 installed in the back of a smartphone P, and reflected (downwardly curved waves) by internal structure. In the illustrated holder the smartphone is contained in a case 96, which is formed with apertures 98 to permit the unattenuated passage of sound. As can be seen, sound waves enter the chamber 99 of the housing, comprised of molded sections 48A'(not shown) and 48B'(which differ from the sections 48A and 48B previously described in providing sidewall and top wall elements 92, 94, respectively). The elements 92, 94 define a supplemental compartment 90 for the containment of an anti-skid base insert 22', the form of which is also modified somewhat from that of the insert 22 previously described; insert 22' also contains a weight 23 (shown in phantom line) for lowering the center of gravity of the holder. It will be appreciated that the top wall 94 presents a relatively smooth, hard surface, that reflects sound waves upwardly through the chamber 99 and acoustically isolates the base insert 22' so as to reduce any sound-damping effect that it might have. As noted above, inserts 22, 22' will normally be made of a resilient, low durometer rubber-like material (albeit they may for example be made of a sound-reflecting material having a friction-producing element or layer on the bottom), which would tend to absorb and damp, rather than reflect, sound waves and thereby diminish acoustic quality.

Figure 19:
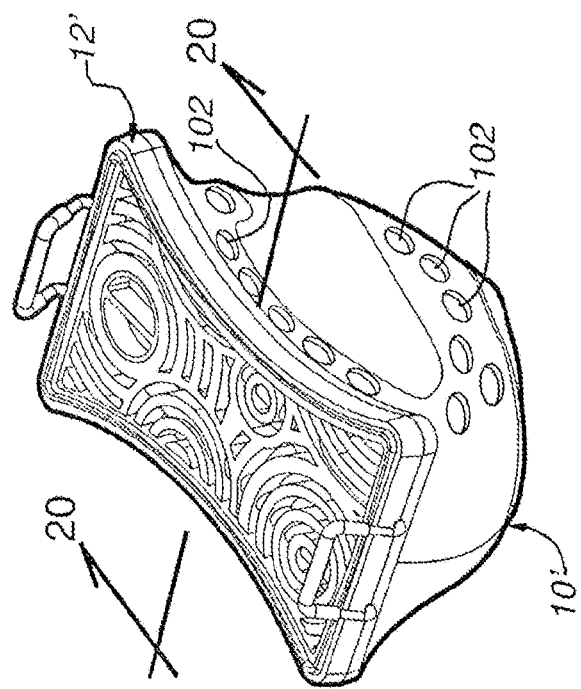
FIG. 19 is a view similar to that of FIG. 1, showing the faceplate attached to modified form of the holder base.
Figure 20:
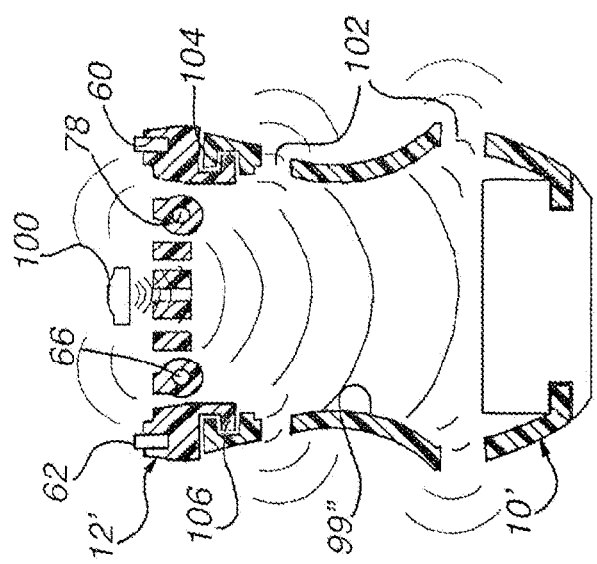
FIG. 20 is a sectional view of the holder of FIG. 19, taken along line 20-20 of FIG. 19 and depicting a loudspeaker positioned in one of many possible positions in relation to the faceplate.

Turning now to FIGS. 19 and 20, it will be seen that in the illustrated holder the sides of the housing, comprising the base 10', are formed with a number of holes 102. Holes may be provided elsewhere in the base and, indeed, the base insert may be perforated to permit free sound transmission therethrough. FIG. 20 simulates the propagation of sound waves from the speaker 100 into the chamber 99", and projection outwardly through the holes 102.

FIG. 20 also shows the attachment of a faceplate 12' to the base 10' by the interengagement of a peripheral flange 106 on the faceplate in a mating peripheral channel 104 that extends about the front opening into the base 10'; assembly is conveniently effected as the housing pieces are joined to one another during manufacture. A snap-fit interengagement may alternatively be enabled, however, by beveling the lower edge of the flange 106 (or by use of analogous structural features), so as to facilitate it being pressed into the top opening of an assembled housing and becoming engaged in the channel 104.

Figure 22:
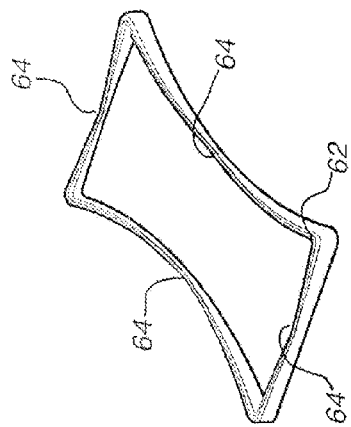
FIGS. 21 and 22 are cross sectional views, taken along lines Z-Z and Y-Y, respectively, of the holder as shown in FIG. 5, modified to contain a U-shaped sound-reflecting insert.
Figure 21:
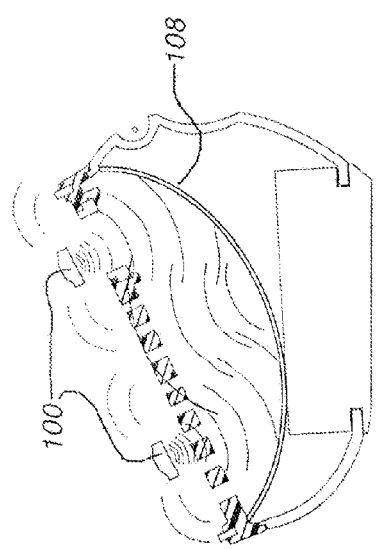
Figure 23:
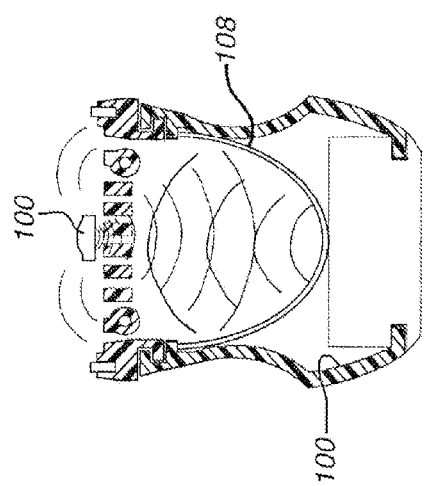
FIG. 23 is a view similar to that of FIG. 21 but with the holder modified to contain a W-shaped sound-reflecting insert.

As depicted in FIGS. 21 and 22, a supplemental, tub-shaped, sound-reflecting insert 108 may be installed within the chamber 99 of the housing for reflecting sound emanating from the speaker 100, and for thereby improving the acoustic qualities of the unit. FIG. 23 shows an alternative form of such a sound-reflecting insert having a W-shaped cross section rather than the U-shaped cross section depicted in FIG. 21. If of suitable structure (e.g., a very thin sheet of a vacuum-formed plastic, such as polypropylene or polystyrene), the baffle may also function to produce a resonant response to, and thereby for amplification of, impinging sound waves.

A form of peripheral faceplate gasket that provides an alternative to the gasket depicted in FIG. 24 is shown in FIG. 25. The alternative gasket consists of lateral elements 112 and corner elements 114, each of which elements is provided with a pair of bayonet tabs 115. Correspondingly, the faceplate 116 is formed with a series of long apertures 118 in its margins, which are dimensioned and configured to receive the arrowhead elements of the tabs 115 (with some compressive deformation) and thereby to engage the gasket elements 112, 114 in fixed positions when the heads resume their normal, relaxed shape. Because the elements 112, 114 are spaced from one another, in a peripheral sense, as so attached to the faceplate 116, sounds emanating from a mounted device can readily project laterally and transversely through the gaps that exist between the gasket elements.

Turning now to drawings that illustrate holders embodying the present invention, it will again be noted that they may share features and elements in common with the holders of the foregoing figures, although such shared features and elements may not be newly numbered or described hereinafter.

It can be seen in FIGS. 26 and 27 that the base, generally designated by the numeral 11, of the holder is formed with three surface flats 13a, 13b, and 13c, disposed adjacent to the flat back surface 15, to provide supplemental supporting means. As shown in FIG. 26b the holder is supported on its flat back surface 15 with the faceplate 17 forming an angle A, having a value of about 26°, with the underlying supporting surface S. In FIG. 26c the holder is supported on the surface flat 13a closest to the back surface 15; in FIG. 26d the holder is supported on the adjacent surface flat 13b, and in FIG. 26e it is supported on the third surface flat 13c (closest to the bottom end of the holder). The angular relationships that exist between the faceplate 17 and the supporting surface S have values of about 62°, 72°, and 82° in the orientations shown in FIGS. 26c, 26d and 26e, respectively.

A small cylindrical weighting element 19 may be inserted into any of the holes 21 that are provided generally adjacent to and associated with each of the surface flats 13a, 13b, and 13c. Doing so offsets the center of gravity of the holder sufficiently to significantly increase stability in each of the three corresponding portrait orientations; in such instances, it will of course usually be advantageous to provide no extra weight in the base insert of the holder.

The cross-sectional view of FIG. 26f shows the angled gripping part or bar 61, which comprises a bottom clamping member, generally designated by the numeral 63, in position for gripping the diagrammatically illustrated smartphone P. The gripping bar 61 is urged to its gripping position from its release positions (depicted in the other illustrations constituting FIG. 26) by the torsion spring 109. It will be noted that the bar 61 is formed with a surface flat 187, which cooperates with the adjacent surface flat 13c on the base 11 to provide good stability in the most upright portrait orientation, which may be (or at least may approach) 90° with respect to the surface S. Stability will (as in all instances) depend upon the mass and weight distribution of the holder and a mounted smartphone.

The supplemental supporting means depicted in FIGS. 28 through 30 consists of a prop member, generally designated by the numeral 21, which can be stowed, in its inoperative position, within a recess 49 formed into the back surface 25 of the base insert 27 of the holder, the latter being generally designated by the numeral 29. As is best seen in FIG. 29, the prop member 21 consists of a leg 31 having a head portion 33 at one end, which is circumferentially corrugated or serrated at 35. It will be appreciated that grooves in the surface 35 cooperate with structure (not shown) on the base insert 27 to secure the leg 31 in each of a range of operative positions angularly displaced from the stowed position. One such position is depicted in FIG. 30a, wherein the faceplate 17 forms an angle "C" of about 40° with the supporting surfaces; a second such position is shown in FIG. 30b, wherein the faceplate angle "C" is about 28°. As depicted, the holder 29 rests upon a back edge 37 extending along the bottom of the base insert 27 to cooperate with the prop member 21 so as to establish and maintain a selected portrait orientation; needless to say, the prop member may cooperate with any other suitable elements (e.g., the surface flats 13a, 13b, and 13c shown in FIGS. 26c, 26d, and 26e) to comparable effect.

The supplemental supporting prop member depicted in FIGS. 31, 32a and 32b, and generally designated by the numeral 39, is similar to that of FIGS. 28 through 30b but, rather than being made for selective angular orientation, it is constructed to be of variable effective length. Thus, the member 39 is comprised of an outer sleeve 41 and in an inner leg 43, the latter being telescopically received within the former. As will be appreciated, mere frictional resistance will normally be sufficient to maintain the elements 41, 43 of the prop member 39 in any selected position of extension, but detents, corrugations, or the like may be provided as well. The prop member 39 includes a head portion 45 by which it is pivotably mounted on the base for movement between operative and inoperative (not shown) positions, only one operative position normally being necessary due to the extendibility of the leg 43 (but other operative angular relationship are not precluded). Other equivalent forms of prop members, and attachment arrangements, will undoubtedly occur to those of ordinary skill in the art.

In many instances it will be desirable to provide external access for adjusting the position of a coarse adjustment, top clamping mechanism rather than providing such means in a position underlying a mounted communication device. Thus, in FIGS. 26a-f and 27 a radially serrated head 189 is provided for rotation of an adjustment screw (not seen) operatively attached to the top clamping part 193, and in FIG. 31 a thumb wheel 191 is operatively attached to an adjusting and/or clamping mechanism (not seen) for the top clamping part 195.

It will be appreciated by those skilled in the art that many variations may be made in the present holder and its features without departure from the scope of the appended claims. For example, while an hourglass-like faceplate is the preferred form, it may be more truly rectangular or of other suitable configurations. It will be appreciated moreover that a faceplate, as such, is not required, with the necessary face structure being integral with the holder base.

Clamping members and mechanisms other that those that are described and/or illustrated may be employed, and may act on a transverse rather than a longitudinal axis, if preferred (while transversely disposed gripping parts may unduly interfere with landscape orientations on a supporting surface, they might also permit a larger angle of tilt in the portrait orientation by resting on a bottom edge of a faceplate or a mounted device); indeed, the clamping means may be mounted in or on the base of the holder rather than the face structure, if so desired. The configuration of the base and the structure of a base housing may also deviate from those described, such as by making the base asymmetric, molding the base (and face structure) as a single piece and/or of a soft material, overmolding to provide antiskid surfaces on the base, etc., and suitable alternative ergonomic shapes and features will occur to those skilled in the art based upon the foregoing disclosure; certainly, aesthetics (such as may be achieved by selected patterns of faceplate perforations, contrasting shapes and colors of inserts and overmoldings, etc.) may vary. Faceplate gaskets, internal acoustic baffles and resonators, etc., of different forms and structure may be envisioned by skilled persons as well, and the placement and nature of indentations or concave channels for secure gripping may take different forms and shapes, and surfaces may be embossed or otherwise textured for enhanced gripping capability.

Finally, as noted above the holder of the invention may be utilized for mounting electronic communication devices other than smartphones, such as mobile phones, portable media players, tablets, personal digital assistants, e-book readers, computers, etc. In some instances the mounted device may extend beyond the periphery of a faceplate or other face structure, and/or the angular relationships of pertinent parts may be such that support elements on a face structure become inaccessible, or ineffective; in those cases the device, securely mounted on the holder, may itself provide elements or surfaces for supporting the assembly in desired orientations (for example, if a wide electronic tablet is mounted on the holder the viewing angle could typically be in the range of about 45° to 72°). It will be appreciated that, when the speakers for the mounted device are located on the front or, as is commonly the case, on an edge of the device, acoustic benefits of the holder may be limited (or indeed precluded) unless other features and/or advantages of the holder are compromised in accommodation.

Thus, it can be seen that the present invention provides a holder for a hand-held electronic communication device that is convenient and effective to use, and that does not require supplemental connectivity. The holder is constructed for comfortable and secure, usually ambidextrous, hand-held manual use, and it affords secure support for a hand-held electronic communication device both on an underlying, generally flat support surface, in portrait and landscape orientations in a multitude of angular attitudes or inclination angles, and also in positions nested in the space between a user's shoulder and head. The holder is capable of use for electronic communication devices having a range of sizes and shapes, while also affording quick and facile mounting and dismounting of the device on and from the holder, and it may afford a high degree of aesthetic appeal as well.

Having thus described the invention, what is claimed is:

1. A holder for the stable support upon a user's shoulder, and upon an underlying planar surface in at least two orientations and at variable angular attitudes, as well as for manual gripping, of a hand-held electronic communication device, comprising:
   a generally wedge-shaped base having a front, a back, a top, a bottom, and laterally opposite sides, and being constructed to enable secure, manual gripping of said holder;
   generally planar face structure on said front of said base; and
   retaining means for disengageably mounting a thin, flat, generally rectangular hand-held electronic communication device, optionally contained within a case therefor, on said face structure of said base;
   said base having a back surface constructed for stably supporting said holder both between a user's shoulder and head and also in a freestanding upright state, in a first angular attitude of said face structure of said base, on an underlying planar surface of a supporting structure, said face structure and said back surface of said base lying substantially on planes that intersect at a first angle, having a value of at least about 10 degrees, so as to dispose said face structure at said first angle relative to such an underlying planar surface, and for portrait orientation of such an electronic communication device so mounted, when said base is so supported on an underlying planar surface;
   supplemental means on said holder for stably supporting said holder in at least one second freestanding upright state, at least one second angular attitude of said face structure, on an underlying planar surface of a supporting structure for portrait orientation of such electronic communication device, said face structure being disposed, relative to the underlying planar surface of supporting structure, at an angle that is greater then said first angle and as large as about 90 degrees, in said at least one second angular attitude; and
   said holder being constructed for stably supporting said holder in at least one third freestanding upright state on such an underlying planar surface, rotated 90 degrees from said portrait orientations, for landscape orientation of such an electronic communication device, so mounted.

2. The holder of claim 1 wherein said supplemental means for supporting comprises at least a first substantially flat surface disposed on said back of said base between said back surface and said bottom of said base, said first substantially flat surface lying substantially on a plane that intersects the plane on which said face structure lies at a said at least one second angle.

3. The holder of claim 2 wherein said supplemental means for stably supporting comprises a second substantially flat surface disposed on said back of said base between said first substantially flat surface and said bottom of said base, said second substantially flat surface lying substantially on a plane that intersects said face structure at another said second angle, said another said second angle having a value substantially greater than the value of said at least one second angle.

4. The holder of claim 3 additionally including at least one weighing element selectively attached to said base for relocation of the center of gravity of said holder so as to increase positional stability with said holder resting on each of said first and second substantially flat surfaces comprising said supplemental means for supporting.

5. The holder of claim 1 wherein said supplemental means for supporting comprises a prop member on said holder that is movable from a nonfunctional position to at least one functional position in which said prop member extends backwardly, relative to said base, for contact with such an underlying planar surface so as to dispose said face structure, in cooperation with other structure of said holder, at said at least one second angle.

6. The holder of claim 5 wherein said prop member is of elongated form, and is of selectively variable length for enabling variation of said value of said at least one second angle with said prop member in said at least one functional position.

7. The holder of claim 5 wherein said supplemental means for supporting includes means for selectively varying an angle at which said prop member extends backwardly relative to said base, in said at least one functional position, for enabling variation of said value of said at least one second angle.

8. The holder of claim 1 wherein said retaining means includes a bottom gripping part that is mounted adjacent said bottom of said base for movement between a gripping position and a release position.

9. The holder of claim 8 wherein said bottom gripping part is pivotably mounted on said holder, and is biased toward said gripping position.

10. The holder of claim 8 wherein said bottom gripping part has a surface that comprises, in said gripping position, said supplemental means for stably supporting said holder.

11. The holder of claim 1 wherein said first angle has a value of at least about 20 degrees and is as large as about 85 degrees.

12. The holder of claim 1 wherein said retaining means acts to apply clamping force and includes a bottom gripping part that is mounted adjacent said bottom of said base for movement between a gripping position and a release position; and a coarse adjustment mechanism that includes a top gripping part disposed adjacent said top of said base and operable to selectively position said top gripping part, for cooperating with said bottom gripping part, for applying such clamping force and for varying the distance over which such clamping force is applied.

13. The holder of claim 1 wherein said base is symmetrical about a longitudinal central axis; wherein said holder includes a faceplate, overlying said front of said base, having a front surface and providing said face structure, said faceplate having a longitudinal axis extending between said top and bottom of said base and a transverse axis extending between said opposite sides of said base; wherein said retaining means is constructed for mounting a hand-held electronic communication device in position on said faceplate with a longitudinal axis and a transverse axis of the communication device aligned with the longitudinal axis and transverse avis, respectively, of said faceplate, said transverse axis of said faceplate being parallel to the underlying surface in such portrait orientations of an electronic communication device, so mounted, and said longitudinal axis of said faceplate being parallel to the underlying surface in said landscape orientation of an electronic communication device, so mounted; wherein said back surface is constructed to have nonskid properties; and wherein said base has at least one area, at a level intermediate said front and said back, that is dimensioned and configured to enhance the secure, hand-held manual gripping of said holder.

14. The holder of claim 13 additionally including a multiplicity of supporting contact elements thereon for stably supporting said holder in said at least one third freestanding upright state, a first plurality of at least three of said contact elements lying in a common plane, on one side of said base, that intersects the plane of said faceplate at a third angle, having a value of about 45 to 85 degrees, so as to dispose said faceplate at said third angle, relative to such an underlying planar surface, when said base is so supported by said first plurality of contact elements, for such landscape orientation of an electronic communication device, so mounted.

* * * * *